United States Patent

Nakagiri et al.

[15] 3,702,466

[45] Nov. 7, 1972

[54] SEMICONDUCTOR INTEGRATED CIRCUIT MEMORY DEVICE UTILIZING INSULATED GATE TYPE SEMICONDUCTOR ELEMENTS

[72] Inventors: Masaru Nakagiri; Katsuhiro Onoda; Ryo Igarashi; Toshio Wada; Sho Nakanuma; Tohru Tsujide, all of Tokyo, Japan

[73] Assignee: Nippon Electric Company, Limited, Tokyo, Japan

[22] Filed: Nov. 4, 1970

[21] Appl. No.: 86,748

[30] Foreign Application Priority Data

Nov. 5, 1969 Japan ......................44/88993
Nov. 5, 1969 Japan ......................44/88994

[52] U.S. Cl. .........340/173 R, 340/173 FF, 307/238, 307/279

[51] Int. Cl. ............................................G11c 11/40

[58] Field of Search......................340/173 R, 173 FF

[56] References Cited

UNITED STATES PATENTS 3,610,967 10/1971 Palfi ..........................340/173

*Primary Examiner*—Terrell W. Fears
*Attorney*—Sandoe, Hopgood and Calimafde

[57] ABSTRACT

A semiconductor integrated circuit includes a plurality of insulated gate field effect memory transistors arranged in a row-column matrix. Each of the memory transistors has an insulating film for establishing electron tapping centers. The source areas of the memory transistors are in the form of teeth-like projections which extend into the space defined between similarly formed projections in the memory transistor drain areas.

7 Claims, 10 Drawing Figures

Figure 1:
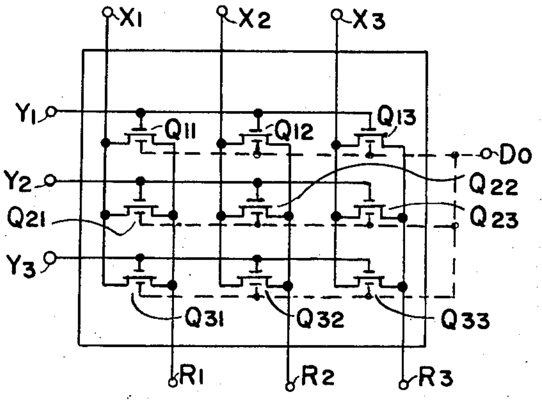

*INVENTORS*
MASARU NAKAGIRI
KATSUHIRO ONODA
RYO IGARASHI
TOSHIO WADA
SHO NAKANUMA
TOHRU TSUJIDE

*by* Sandoe, Hopgood & Calimafde
ATTORNEYS

*INVENTORS*
MASARU NAKAGIRI
KATSUHIRO ONODA
RYO IGARASHI
TOSHIO WADA
SHO NAKANUMA
TOHRU TSUJIDE by Sandoe, Hopgood & Calimafde
ATTORNEYS

*INVENTORS*
MASARU NAKAGIRI
KATSUHIRO ONODA
RYO IGARASHI
TOSHIO WADA
SHO NAKANUMA
TOHRU TSUJIDE
by
Sandoe, Hopgood & Calimafde
ATTORNEYS

SEMICONDUCTOR INTEGRATED CIRCUIT MEMORY DEVICE UTILIZING INSULATED GATE TYPE SEMICONDUCTOR ELEMENTS

The present invention relates generally to semiconductor integrated circuits, and more particularly to an integrated circuit which uses insulated gate field effect transistors as the memory devices.

A typical prior art memory employs means such as a magnetic memory device, a bistable memory device such as a flip-flop circuit, an insulated gate semiconductor element of metal-oxide-semiconductor construction utilizing the hysteresis characteristics in the capacitance-voltage curve in a silicon nitride film, or the permanent transfer characteristics of a similar curve in an alumina film.

The use of magnetic memory device is undesirable for a large volume memory device which requires high speed, because of the difficulties of high speed read-out, in making connection with associated external electric circuits, and in miniaturizing the circuit.

A typical bipolar integrated circuit using a flip-flop memory device includes a reverse polarity type of epitaxial layer grown on a silicon substrate of one polarity type, and circuit components such as transistors, diodes, resistors, and the like, which are insulated by a diffusion region in the epitaxial layer, and including an impurity of the same conductive polarity as that of the substrate. Such a device may be used as a high speed memory, but its manufacturing process is complex, the isolating diffusion region is relatively large, productivity and reliability are both low, and the integration density of the circuit is necessarily low.

A memory device which comprises an insulated gate integrated circuit using a flip-flop circuit has been used as a large capacity memory. However, it is undesirable from the viewpoint of cost, integration density and reliability of the circuit, because six components are needed to form a single storage address or bit, and the circuit is complex.

A semiconductor device of metal-oxide-semiconductor structure which utilizes the hysteresis in the capacitance-voltage curve of a silicon nitride film is described in an article in "Applied Physics Letters," vol. 12, No. 8, at page 260. Also a permanent transfer characteristic appearing in the capacitance-voltage characteristic curve is described in a co-pending U.S. application Ser. No. 44,358, filed June 8, 1970, entitled *Memory Device with Semiconductor Memory Device*, now U.S. Pat. No. 3,651,490 and assigned to the assignee of this application. A memory device which uses transistors having these characteristics provides the possibility of large scale integration and may be used as a large scale memory device, because one bit is formed with only one component.

However, the memory device which comprises the bipolar type of integrated circuits or insulated gate type field effect integrated circuit, requires both longitudinal and transverse wiring to electrically connect each of the memory elements arranged in the form of matrix. Accordingly, in order to avoid short circuits between longitudinal wiring and transverse wiring, insulation between both wirings must be provided such as by embedding either one layer of wiring by the use of diffusion resistance, or multi-layer wiring in the substrate. Therefore, in the prior art integrated circuit, it is necessary to selectively provide openings in the insulating layer by means such as photoetching for taking out the electrodes. These processes are difficult to perform, the reliability of the completed integrated circuit is lower, and the practical realization of a high density and large scale integrated circuit is limited.

Accordingly, it is an object of the invention to provide a high reliability and high integration density memory device.

It is a further object of the invention to provide a high speed memory device which is relatively simple in structure, which is highly suitable for mass production, and which has excellent electrical characteristics.

It is another object of the invention to provide a two-dimensional integrated circuit memory device.

It is yet a further object of the invention to provide a three-dimensional integrated circuit memory device.

According to the invention, an insulated gate semiconductor integrated circuit is provided which comprises a semiconductor substrate of one polarity. Drain and source areas of an opposite polarity are formed within the semiconductor substrate. The source and drain areas of the memory transistors in a given row or column in the memory matrix are in the form of a plurality of protruding teeth, and at least one tooth-like projection of the source (or drain) area is fitted into the space between the protruding teeth of the drain (or source) area of the memory transistors. An insulating film is coated on the surface of the substrate between the source and the drain areas, and over the drain and source areas of the memory transistors, thus storing electric charge therein upon the application of an electric field in excess of a critical value. Drain and source electrodes are in respective ohmic contact with the drain and source areas, and a plurality of gate electrodes extend parallel on the upper surface of the insulating film beyond the drain and source areas.

A semiconductor integrated circuit according to the invention may use a silicon nitride-silicon oxide double layer in which the charge is stored by applying an electric field beyond the critical value, or preferably, an insulating film which has the characteristics that electrons are trapped in the permanent trapping center within the insulating film as described in said co-pending application. The insulating film is extremely stable and traps electrons as explained in the specification of said application. Accordingly, when electrons are trapped within the insulating film, the capacitance-voltage characteristics of the transistor having this insulating film is changed and the characteristics after change are thus stable.

The threshold voltage of the gate in the insulated gate field effect transistor after the change in the capacitance-voltage characteristic, is different from that of the gate prior to the change. Therefore, it is possible to know the condition of this transistor by checking whether or not this transistor is operative when a voltage is applied to the gate of that insulated gate type field effect transistor. Consequently, this insulated gate type field effect transistor can be used as a memory element.

Figure 2A:
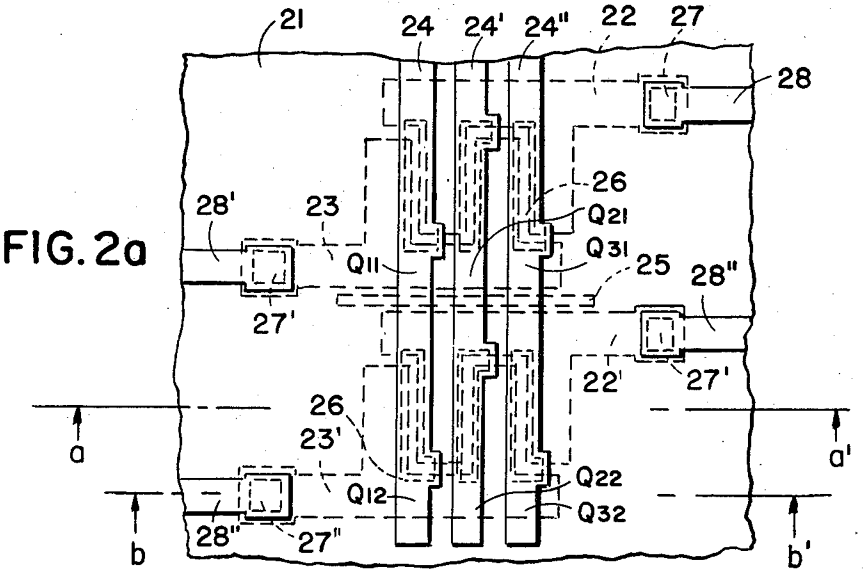
Figure 2B:
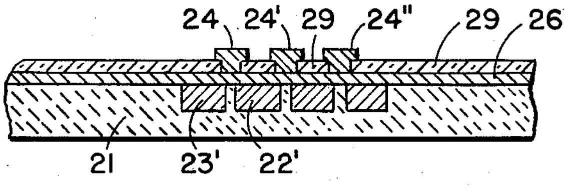

To the accomplishment of the above and to such further objects as may hereinafter appear, the present invention relates to a semiconductor integrated circuit memory device utilizing insulated gate type semiconductor elements, substantially as defined in the appended claims and as described in the following specification taken together with the accompanying drawings in which:

FIG. 1 is a schematic diagram of a two-dimensional memory circuit;

FIG. 2*a* is an enlarged plan view of a portion of a semiconductor circuit which embodies the circuit of FIG. 1;

FIG. 2*b* is a cross-sectional view taken along the line *b–b'* of FIG. 2*a;*

Figure 2C:
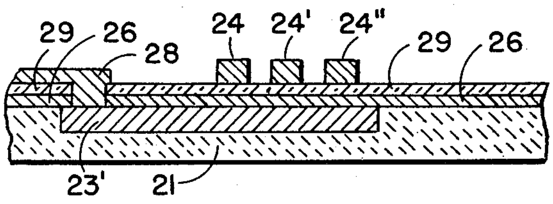

FIG. 2*c* is a cross-sectional view taken along the line *c–c'* of FIG. 2*a;*

Figure 3:
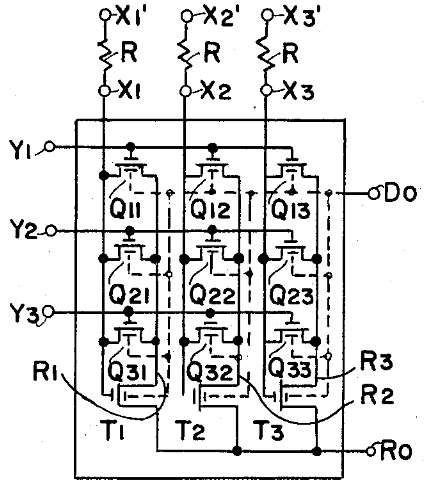
Figure 4A:
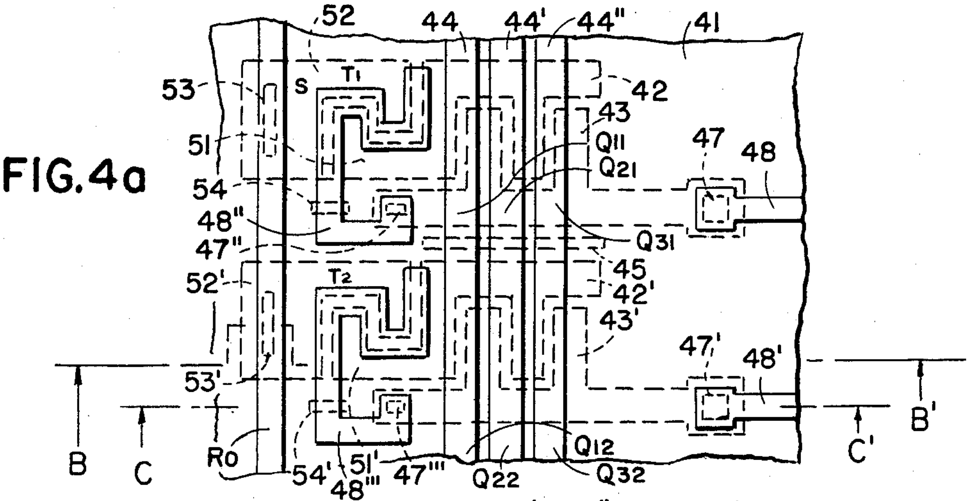
Figure 4B:
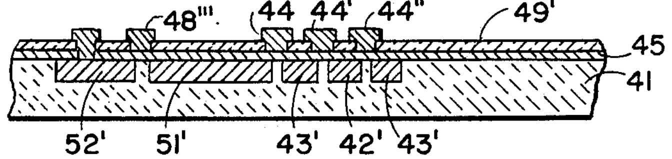

FIG. 3 is a schematic circuit diagram of one memory plane for a three-dimensional memory device;

FIG. 4*a* is a partly enlarged view which represents the structure of the semiconductor circuit as shown in FIG. 3;

FIG. 4*b* is a cross-sectional view taken along the line B–B' of FIG. 4*a;*

Figure 4C:
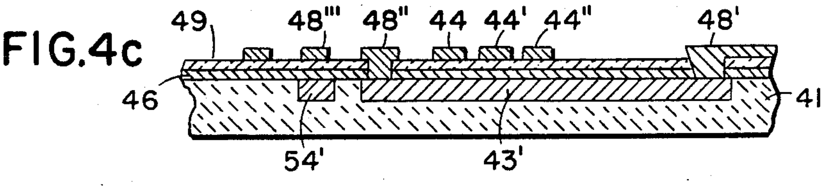

FIG. 4*c* is a cross-sectional view taken along the line C–C' of FIG. 4*a;*

Figure 6:
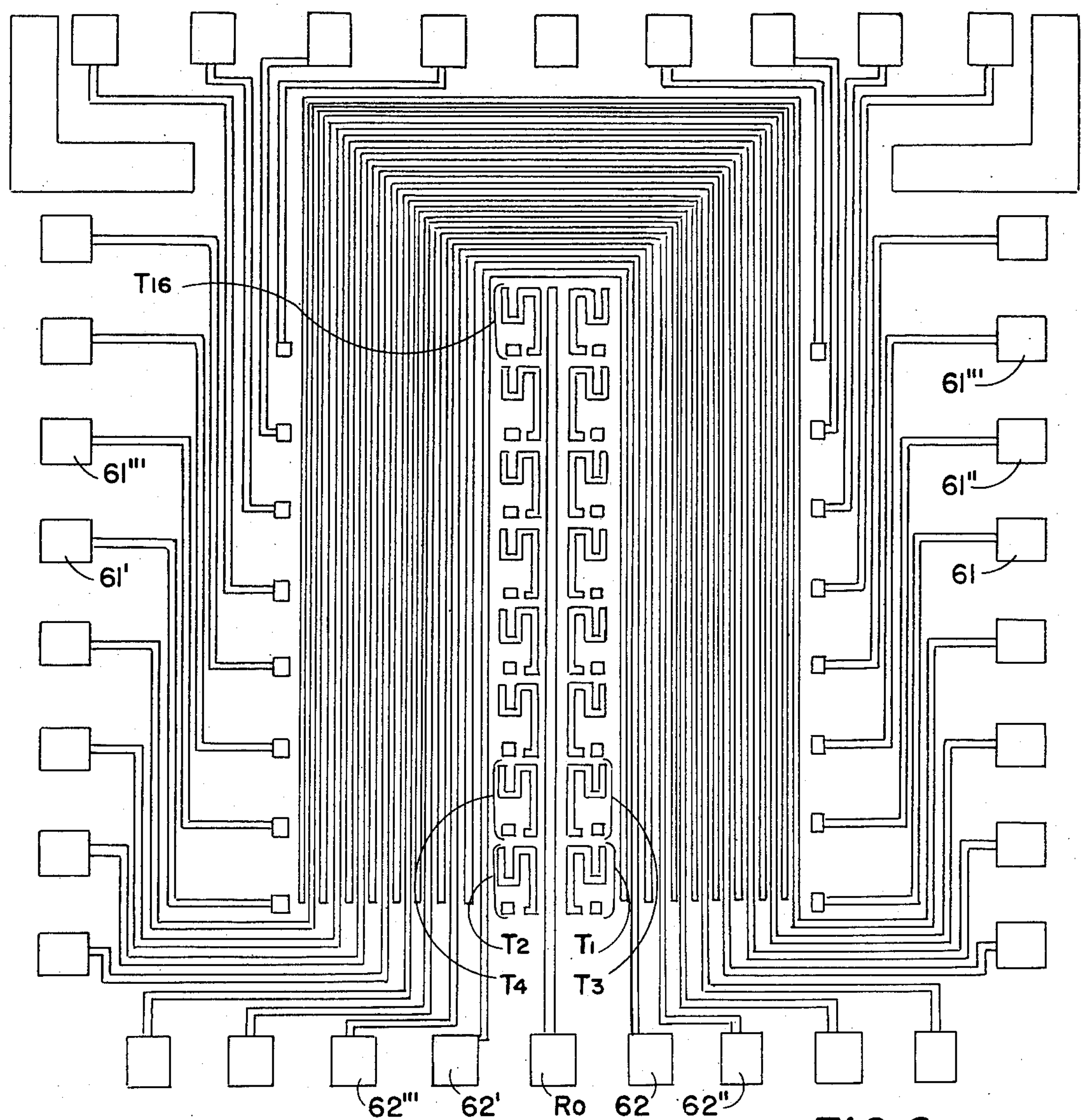
Figure 5:
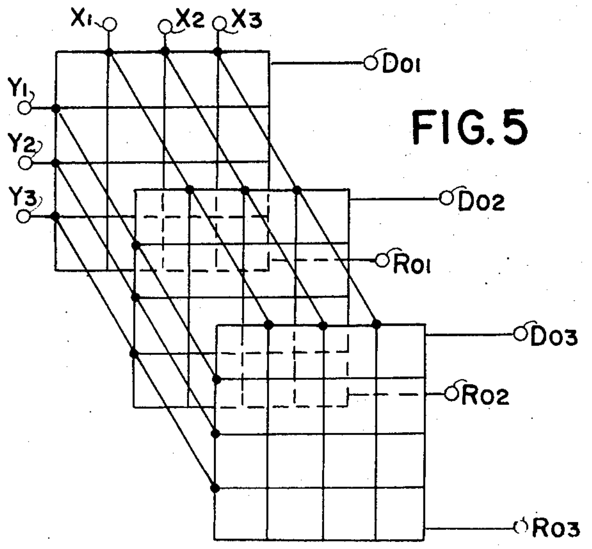

FIG. 5 is a schematic illustration of a three-dimensional memory device constituted by the use of a plurality of semiconductor circuits as shown in FIG. 3 – FIG. 4*c;* and FIG. 6 is a top plan view illustrating a wiring pattern according to a further embodiment of the invention.

Referring to FIG. 1, there is shown a typical two-dimensional memory matrix circuit, which, for simplification of illustration, is shown as comprising nine insulated gate field effect transistors $Q_{11}$, $Q_{12}$, - - - $Q_{33}$.

The gate, drain, and source electrodes of these insulated gate field effect transistors are connected to column drive lines $Y_1$, $Y_2$, $Y_3$, row drive lines $X_1$, $X_2$, $X_3$, and read-out row lines $R_1$, $R_2$, $R_3$, as shown. In FIG. 1, the dotted lines represent the substrate gate electrodes common to each of the field effect transistors $Q_{11}$, $Q_{12}$, - - - $Q_{33}$, and is designated Do.

Selective wiring of new data into the memory matrix of FIG. 1 is achieved by connecting the terminals of a driving circuit (not shown in FIG. 1) through resistors (also not shown in FIG. 1) to each row drive line $X_1$, $X_2$, and $X_3$. For example, to write a new information signal into the memory address defined by transistor $Q_{22}$, that is, at the intersection of row two and column two of the matrix, a half voltage $Vc/2$ less than the critical value is applied to column drive line $Y_2$, a negative half voltage $Vc/2$ is applied to row drive line $X_2$ and to the substrate electrode for establishing voltage Vc which exceeds the critical value required for writing into the insulated gate field effect memory transistor. The other X and Y row and column drive lines are at a potential of zero volts. At this time, channels are formed below the gates of transistors $Q_{21}$, $Q_{22}$, $Q_{23}$ by the application of the voltage to the column drive line $Y_2$. Voltages between the channels of these transistors and the semiconductor substrate become $Vc/2$, Vc, and $Vc/2$ respectively.

Since each drain and source junction is reverse-biased, current does not flow between the drain and source areas of each transistor and the transistor substrate. Accordingly, only the electric field within the insulating film of the gate of the transistor $Q_{22}$ exceeds the critical value required for trapping electrons in a permanent trapping center, and, as a result, electrons are trapped in the permanent trapping center. Consequently, the capacitance-voltage characteristic of transistor $Q_{22}$ changes, and the threshold value of the gate voltage of this transistor changes. That is, only transistor $Q_{22}$ has been written selectively. A more detailed description of the operation of the insulated gate field effect transistors having the permanent trapping center is given in said copending application which is incorporated by reference herein.

On the other hand, the read-out of stored data from a selected address location in the memory is performed by removing a resistor and keeping the semiconductor substrate at the selected memory address at a constantly lower potential than that of the source and the drain areas. For example, in order to read out the memory condition of transistor $Q_{22}$, a voltage is applied to row and column drive lines $X_2$ and $Y_2$. This voltage is slightly higher than the gate threshold voltage of the transistor in the condition that electrons are not trapped in the permanent trapping center. At this time, if the transistor $Q_{22}$ is in the conductive state, corresponding to one stored logic value, e.g., a 1, the predetermined current flows through the read-out line $R_2$. When the transistor $Q_{22}$ is in the cut-off state, corresponding to the other stored logic value, e.g., 0, current does not flow to the read-out line. Therefore, the memory content in transistor $Q_{22}$ can be obtained from the read-out line $R_2$.

Referring now to FIGS. 2*a* and 2*b*, drain areas 22 and 22', and source areas 23 and 23' are formed in the upper portion of a P-type semiconductor substrate 21, and gate electrodes 24, 24', 24'' are formed, wherein six field effect memory transistors $Q_{11}$, $Q_{12}$, $Q_{21}$, $Q_{22}$, $Q_{31}$, $Q_{32}$ are formed for the memory matrix shown in FIG. 1.

In the fabrication of the circuit of FIG. 2, a high concentration P-type area 25, N-type drain areas 22 and 22' and source areas 23 and 23' are selectively diffused into P-type substrate 21. Successively, an alumina film 26 having a thickness of about 2,000A is coated thereon, after which a silicon dioxide film 29 having a thickness of about 5,000A is coated on alumina film 26. Silicon dioxide film 29 protects alumina film 26 and serves to reduce the spurious effects produced by the circuit wiring.

Aluminum leads 28, 28', 28'' and 28''', provided on silicon dioxide film 29, have a thickness of about $1\mu$ and make ohmic contact with drain areas 22 and 22' and source areas 23 and 23' through windows selectively formed in films 26 and 29 for introducing electrodes 27, 27', 27'' and 27'''. Furthermore, aluminum gate electrodes 24, 24' and 24''' having a thickness of about 1 are coated on the silicon dioxide film 29 with direct contact to the upper surface of alumina film 26 as a part of a slot provided in the silicon dioxide film 29. Thus, a memory matrix is obtained and the gate electrode leads 24, 24' and 24''' correspond to the column drive lines $Y_1$, $Y_2$, $Y_3$ respectively, the drain area 22 and aluminum lead 28 correspond to the row drive line $X_1$, the drain area 22' and the aluminum lead 28'' correspond to row drive line $X_2$, the source area 23 and the aluminum lead 28' to a read-out lead $R_1$, and the source area 23' and the aluminum lead 28''' correspond to the read-out line $R_2$.

In the semiconductor integrated memory circuit herein disclosed, the source and the drain areas in each memory element extend generally in the direction of a digit line so that it is not necessary to specially wire each digit line, and it is possible to increase the integration density without sacrificing high reliability and productivity by shortening the distance between the gate electrodes.

Also, according to this embodiment, there is the further advantage that deviation of calibration in the longitudinal direction of the gate electrode have a considerable allowance. Moreover, channel width is broadened by forming roughness in the source and the drain areas adjacent to each other, and by forming a protrusion in the gate electrode.

The above mentioned embodiment is illustrated with reference to a two-dimensional memory device. It will be next illustrated with reference to an embodiment of a three-dimensional memory device as shown in FIG. 3, wherein a memory circuit constituting nine bits of memory matrix plane is shown.

This circuit is similar to the circuit shown in FIG. 1 except that gate transistors $T_1$, $T_2$ and $T_3$ for row selection are added and read-out output is obtained through one of the gate transistors and a common line Ro. That is, the read-out lines $R_1$, $R_2$, and $R_3$ are respectively connected to the drain of each N-channel insulated gate field effect transistor $T_1$, $T_2$, and $T_3$ in each row of the matrix for read-out from each row. The source electrodes of these transistors are connected for read-out to the common read-out lead Ro. On the other hand, the row drive leads $X_1$, $X_2$, and $X_3$ are respectively connected to the gate electrodes of transistors $T_1$, $T_2$, and $T_3$.

A write-in operation to the circuit of FIG. 3 is similar to that in the circuit of FIG. 1. When a drive voltage is applied to the X, Y row and column drive lines (for example lines $X_2$ and $Y_2$) during read-out, then the corresponding gate transistor (e.g., transistor $T_2$) for row selection is operated, and if the corresponding memory transistor (e.g., transistor $Q_{22}$) is in conduction, a predetermined amount of current passes through gate transistor $T_2$ to the common line Ro. If memory transistor $Q_{22}$ is cut off, current will not pass through gate transistor $T_2$ to the common line Ro. Accordingly, the memory content of the selector memory transistor $Q_{22}$ is read out from common line Ro.

FIG. 4a is a partly enlarged circuit of a semiconductor integrated circuit which embodies the memory circuit of FIG. 3, showing only a portion of the circuit including transistors $Q_{11}$, $Q_{21}$, $Q_{31}$, $Q_{12}$, $Q_{22}$, $Q_{33}$, $T_1$ and $T_2$ for the sake of simplification. The circuit of FIG. 4c comprises a P-type semiconductor substrate 41, source areas 42 and 42', drain areas 43 and 43' diffused into substrate 41 and forming pairs respectively with source areas 42, 42', and gate electrode leads 44, 44' and 44''. For the sake of simplification in illustration, only three gate electrode leads are shown. The circuit further includes a channel stopper or isolation region 45 comprising a P-type area of higher concentration than that of P-type semiconductor substrate 41, an alumina film 46, pores or windows 47, 47', 47'', 47''' for introducing electrodes provided in alumina film 46, and a silicon dioxide film 49 having a depth which reaches to the ends of drain areas 43 and 43'. Pores 47', 47''' are shown best in section in FIG. 4c. Electrodes 48, 48', 48'' and 48''' formed on silicon dioxide film 49 make ohmic contact with the drain areas through pores 47, 47', 47'', and 47''' for introducing said electrodes. The alumina film 46 and the silicon dioxide film 49 coats over the whole surface of the semiconductor substrate, except for the locations of windows 47, 47', 47'', 47''' for introducing the electrodes.

As seen in FIG. 4a, the source areas 42 and 42' and drain areas 43 and 43' are in the form of the teeth of a comb. In this figure, there are shown only two such teeth for the sake of simplification. The teeth-like regions of source areas 42 and 42' extend into the spaces defined by the teeth-like regions of drain areas 43 and 43' respectively. On the channel area formed between both teeth of the drain and source areas, silicon dioxide film 49 is removed to form a slot through which gate electrodes leads 44, 44', and 44'' directly contact with the alumina film. Accordingly, each memory element transistor which comprises one insulated gate field-effect transistor, is formed with said channel area, the teeth of the drain and source areas keeping said channel area therebetween, an alumina film, and gate electrodes thereon.

FIGS. 4a – 4c also illustrate the gate transistors $T_1$ and $T_2$ of the circuit of FIG. 3. Drain areas 51 and 51' are formed in a body to each source area of the transistors $Q_{11}$ – $Q_{31}$ and $Q_{32}$. Source areas 52 and 52' of the gate transistors for read-out respectively define a pair with each drain area 51 and 51'. The silicon dioxide film 49 and the alumina film 46 on successive portions of the source areas 52 and 52' in the read-out transistor are partly removed, and windows 53 and 53' for introducing the electrodes are provided through which the common line Ro makes ohmic contact with source areas 52 and 52' of the transistors $T_1$ and $T_2$.

Electrodes 48'' and 48''' are respectively introduced from drain areas 43 and 43' of the memory element to the gate electrode of transistors $T_1$ and $T_2$, and extend on alumina film 46 between drain area 51 and source area 52, and drain area 51' and source area 52'. P-type high concentration areas 54 and 54' are provided in the circuit for isolation purposes.

To fabricate the integrated memory matrix circuit of the invention, a P-type silicon substrate of a resistivity of between 4 and 6 ohm/cm is first prepared, and P-type areas 45 and 45', 54 and 54' of high concentration are selectively diffused in vapor to the substrate. N-type source areas 42, 42', 52 and 52' and drain areas 43, 43', 41 and 51' are then selectively diffused in vapor. Thereafter, alumina film 46 having a thickness of about 2,000A is then coated on film 46 in order to protect alumina film 46 and decrease spurious effects due to wiring. Silicon dioxide film 49 of this portion of the circuit is selectively removed to selectively form windows 47, 47', 53 and 53' for introducing the electrodes and to provide only alumina film as the insulating film for the gates of the memory transistors. Then, the aluminum electrodes 48, 48' and 48'' and common line Ro having a thickness of about 1$\mu$ and making ohmic contact with drain areas 43 and 43' and the source areas 52 and 52' through windows 47 and 47', 53 and 53' respectively, are provided, and the aluminum electrodes 44, 44', 44'' are coated thereon. Thus, there is obtained the semiconductor integrated circuit of a memory matrix configuration having a circuit as shown in FIGS. 4*a* – *c*.

Referring to FIG. 5, there is shown a three-dimensional memory device employing the memory matrix as shown in FIG. 3 and FIGS. 4*a* – 4*c*. For the sake of simplification in illustration, FIG. 5 only illustrates three memory matrices, each having three rows and three columns. The read-out lines $Ro_1$, $Ro_2$ and $Ro_3$ and the back gate electrodes $Do_1$, $Do_2$, $Do_3$ of each memory matrix plane are independently introduced for connection to an external driving circuit and read-out circuit (not shown). The row drive lines $X_1$, $X_2$ and $X_3$ and the column drive lines $Y_1$, $Y_2$ and $Y_3$ are connected correspondingly to each of the memory matrices.

A write operation is performed on the memory of FIG. 5 by selecting a transistor of a particular memory matrix plane with the row drive lines, the column leads, and the back gate electrode. A read-out operation is performed by applying a voltage to the desired row drive line and column line, and a series of signals equal to the number of planes or sheets of the memory matrices arranged in three dimensions is obtained from the read-out line of the individual memory matrix.

Referring to FIG. 6, there is shown a semiconductor integrated circuit which uses $16 \times 16 = 256$ insulated gate type field effect transistors and 16 read-out transistors and constitutes a memory matrix similar to that shown in FIG. 3. The semiconductor integrated circuit in this embodiment comprises drain electrodes 61 which are respectively introduced from end portions of 16 drain diffusion areas formed within a P-type semiconductor substrate, a common output line Ro wherein read-out output signals are introduced through the read-out transistors $T_1 - T_{16}$ formed in parallel near the center of the substrate from end portions positions near the center of the semiconductor substrate of 16 source diffusion areas formed in the semiconductor substrate, and 16 gate electrode leads which extend in parallel on 16 pairs of drain and source areas.

Each pair of drain and source areas is used as one of the 16 row drive lines, and the gate electrode leads 62 are used as column drive line intersecting with the row lines. Each pair of drain and source areas and the read-out transistors $T_1$, $T_2$, $-T_{16}$ have similar construction to that of the embodiment in FIGS. 4*a*–4*c*. The transistor pair $T_1$ and $T_2$, $T_3$, and $T_4$, $-T_{15}$ and $T_{16}$ which interpose the read-out common line Ro and are aligned on both sides thereof, each have their source area formed in pairs, whereby electrode wiring to the read-out common line R*o* is simplified.

According to the invention, since the drain and source areas of each memory element extend generally in the direction of the row line, the wiring of each digit line is not required. Accordingly, the difficulties of manufacturing are reduced considerably and the integration density of the circuit can be increased by shortening the distance between the gate electrodes without sacrificing high reliability and productivity. Moreover, the calibration in the longitudinal direction when forming the gate electrode leads, such as the aluminum lines, need not be strict and thus fabrication is less complex and costly, since requirements for precision in calibration are not as great as in the prior art.

In the above mentioned embodiments, the width of the channel may be broadened by providing a protrusion in the gate electrode and roughness in the source and drain areas, to thereby increase the mutual conductance.

In addition, while the embodiments of the invention herein describe the use of alumina film as the insulating film having the permanent trapping center, zirconium oxide or tantalum oxide having the like property may also be used. Since the read-out transistor does not utilize the trapping of electrons, the insulating film having the permanent trapping center need not be used as the gate insulating film. Therefore, silicon dioxide or silicon nitride may be used.

While the invention has been described and illustrated with respect to a particular number of bits in each matrix, the invention is not to be so limited. It will be clear that the invention can be applied to a memory matrix having any desired number of stored bits.

Thus while several embodiments of the present invention have been herein specifically described, it will be apparent that modifications may be made therein without departing from the spirit and the scope of the invention.

We claim:

1. A semiconductor integrated memory circuit comprising a substrate, a plurality of field effect transistors aligned in the form of a matrix defined by a plurality of intersecting rows and columns and formed in said substrate, each of said transistors having a gate insulating film including a trapping center for semi-permanently trapping electrons by means of an electric field exceeding a critical value applied to said insulating film, a plurality of column drive lines coupled respectively to the gate electrode of each of said transistors in each column of said matrix, a plurality of row drive lines coupled respectively to the drain electrode of each of said transistors in each row of said matrix, a read-out line coupled to the source electrode of each of said transistors in each row, the drain and source areas of all of said memory transistors in each of one of said rows and columns, respectively comprising integral diffused layers formed adjacent one another in said substrate, said gate insulating films respectively extending over adjacent ones of said source and drain layers, and a plurality of gate electrode leads of the same number of one of said rows and columns formed on said insulating film and extending over said drain and source layers.

2. The semiconductor integrated circuit of claim 1, further comprising a read-out transistor for each of said rows of memory transistors, one of a drain and source area of said read-out transistor being formed continuously with one of a drain and source area in a corresponding row of said memory transistors, the other said source and drain area of said read-out transistor being connected to a common read-out line, and the gate electrode of said read-out transistor being connected to the other of the source and drain area in the corresponding row of said memory transistors.

3. The semiconductor integrated circuit of claim 1, wherein said gate insulating film of said memory transistors is an $Al_2O_3$ film.

4. The semiconductor integrated circuit of claim 2, wherein pairs of said drain and source areas are formed on one side of the center line of said semiconductor substrate, and the read-out transistor corresponding to each pair of said source and drain areas is formed on the other side of the center line of said substrate.

5. The semiconductor integrated circuit of claim 2, wherein said gate insulating film of said insulated gate type field effect memory transistors is an alumina film.

6. The semiconductor integrated circuit of Claim 4, wherein each of said source areas of adjacent ones of said read-out transistors is interposed in parallel to one another on each side of the center line of said substrate, and said source areas are coupled to a common electrode line extending between adjacent ones of said memory transistors.

7. The memory circuit of claim 1, in which said integral source and drain layers each include tooth-like projections interfitted but spaced from one another.

* * * * *